United States Patent [19]

Celms

[11] 4,067,591
[45] Jan. 10, 1978

[54] BASE FOR NESTABLE SHOPPING CART

[75] Inventor: Harry Celms, Battle Creek, Mich.

[73] Assignee: Roblin Industries, Inc., Battle Creek, Mich.

[21] Appl. No.: 698,149

[22] Filed: June 21, 1976

[51] Int. Cl.$^2$ .............................................. B62B 3/02
[52] U.S. Cl. ............................. 280/33.99 S; 280/79.3
[58] Field of Search ................ 280/33.99 R, 33.99 H,
280/33.99 F, 33.99 S, 33.99 T, 35, 36 R, 36 B,
41 A, 79.1, 79.2, 79.3

[56] References Cited

U.S. PATENT DOCUMENTS

| | | | |
|---|---|---|---|
| 2,583,513 | 1/1952 | Maslow | 280/33.99 H UX |
| 2,868,556 | 1/1959 | Cauthon | 280/33.99 H |
| 2,962,292 | 11/1960 | Edmonston | 280/33.99 H |
| 3,464,715 | 9/1969 | Anderson | 280/36 R |
| 3,834,724 | 9/1974 | Trubiano | 280/33.99 H |

Primary Examiner—Joseph F. Peters, Jr.
Assistant Examiner—Gene A. Church
Attorney, Agent, or Firm—Blanchard, Flynn, Thiel, Boutell & Tanis

[57] ABSTRACT

A nestable shopping cart having a basket assembly supported on a wheeled base assembly which includes a rearwardly opening U-shaped base member having rearwardly projecting side rails. The side rails include diverging front rail portions which project rearwardly from the front end of the cart and terminate in rear rail portions which extend over a substantial length and terminate at the rearward end of the cart. The rear rail portions diverge outwardly with respect to the front rail portions and define a flared chutelike opening at the rearward end of the base member.

The base assembly can also have a tray mounted thereon. The forward end of the tray has a cross rod, the ends of which project into openings formed in the opposite side rails for creating a hinged connection. The tray also includes rearwardly extending support rods which pass over a mounting member which extends transversely between the side rails and mounts thereon the front casters. The two outermost support rods pass closely adjacent the opposite sides of the nuts which mount the front casters to prevent sideward displacement of the tray so that it cannot become disengaged from the side rails. These nuts project upwardly a sufficient extent to permit upward pivoting of the tray during nesting.

18 Claims, 8 Drawing Figures

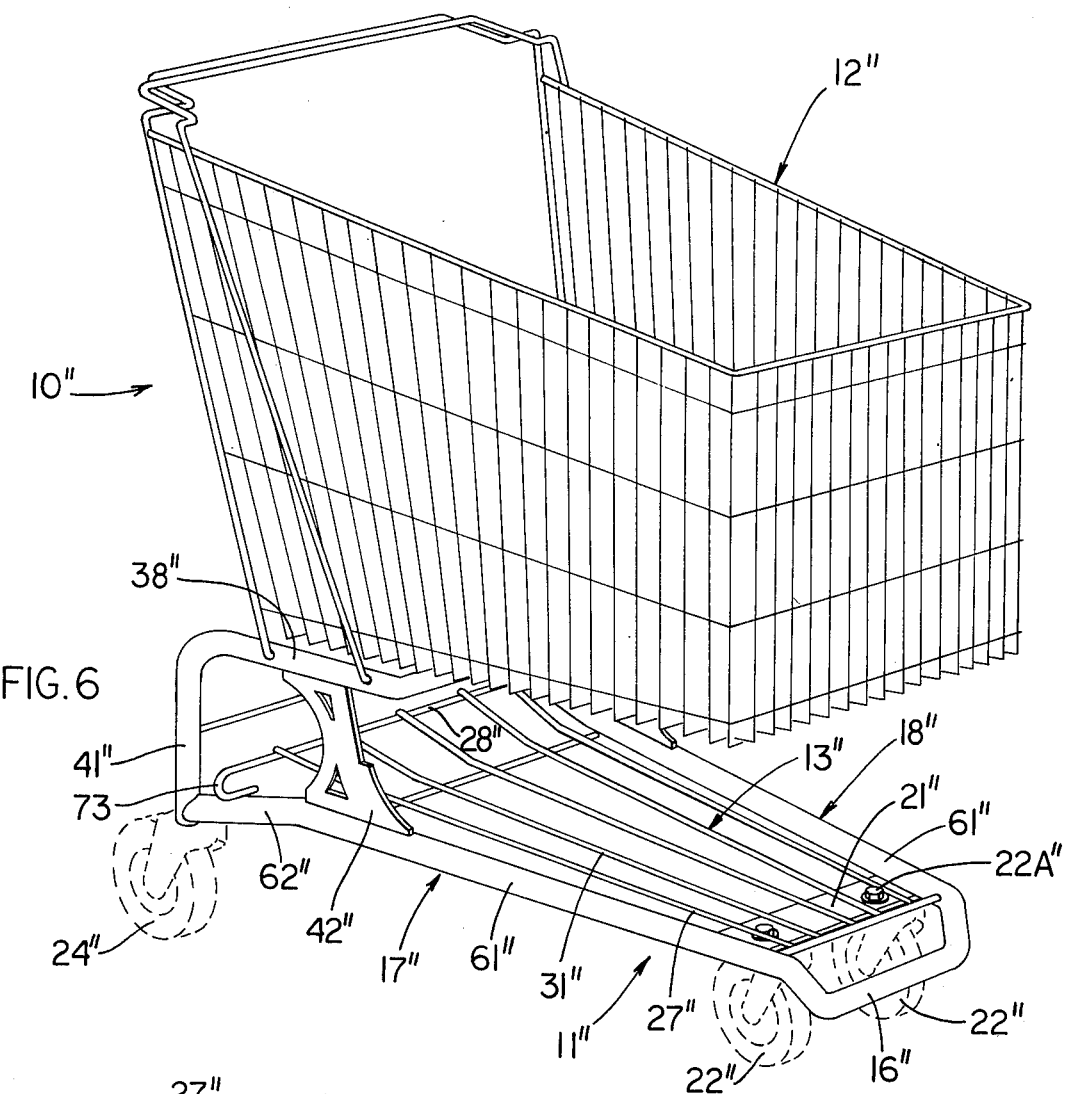
FIG. 6
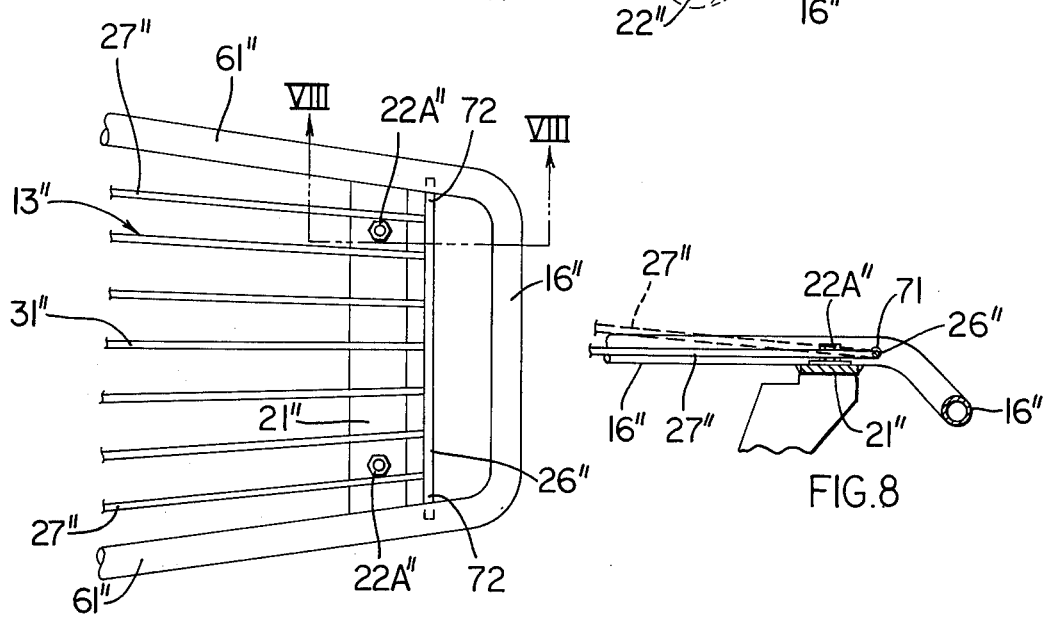
FIG. 7
FIG. 8

BASE FOR NESTABLE SHOPPING CART

FIELD OF THE INVENTION

This invention relates to a nestable shopping cart and, in particular, to an improved base structure which significantly improves the nestability and stability of the cart.

BACKGROUND OF THE INVENTION

Shopping carts employing a basket mounted on a wheeled base are utilized extensively in supermarkets, department stores and the like. These carts are conventionally constructed of a plurality of metal wires and tubular members which are individually fabricated and then individually assembled to form the cart. To facilitate the handling and storing of large numbers of such carts, the carts are conventionally provided with base and basket structures which diverge rearwardly so that the carts can be nested together. To permit this nesting, the base structure is conventionally provided with a rearwardly opening U-shaped bottom rail, the legs of which extend longitudinally along the opposite sides of the base structure and form the side rails thereof. These side rails are generally straight throughout the length of the cart and normally diverge outwardly at an angle of 5° to 8° as the rails extend longitudinally rearwardly of the cart. These opposed diverging side rails thus define an included angle therebetween which is normally in the range of about 10° to 16°, whereby the base structures of like carts can thus be nested one within another.

While conventional carts of the above-described type have been extensively utilized, nevertheless these carts have possessed structural and operational features which, while tolerated, have been less than desired. For example, the above-described base structure has necessarily limited the nestability of such carts, and particularly the initial insertion of one cart into another. While the diverging U-shaped base rail does permit limited misalignment between the carts as they are being initially moved into a nested condition, nevertheless the amount of such misalignment is extremely small so that proper nesting of the carts can normally be satisfactorily and efficiently achieved only by ensuring that the carts are substantially aligned prior to relatively moving the carts into the nested relationship. This thus makes nesting of a plurality of carts a difficult manipulation, particularly when a large plurality of carts are being simultaneously nested or where the available floor space is limited. Also, cart manufacturers have generally recognized the necessity of maintaining the base rail with an included angle of approximately 10° to 16° to ensure that the carts are properly aligned when they are fully nested one within the other. For this reason, a rather precise alignment has been tolerated as being a necessity for nesting carts of this type.

A further disadvantage of the above-described nestable cart, which disadvantage stems directly from the design of the base structure, is the overall stability of the cart. Because of the restrictions placed on the size and geometry of the rearwardly opening U-shaped rail, which restrictions are due to the desired nestability of the cart, the front wheel assemblies are positioned close together to permit their free passage between the more widely spaced rear wheels when two such carts are nested together. This thus results in the spacing between both the front and rear wheel assemblies being less than the overall width of the basket, whereupon the cart may have a tendency to tip sidewardly when a heavy load is placed adjacent the sides of the basket, particularly adjacent the front corners thereof, such as due to a child standing adjacent or leaning over the edge of the basket.

Another operational disadvantage experienced with conventional carts, and particularly carts of the type employing a basket adapted to be positioned with the bottom thereof either aligned with or over the top of the checkout counter, is the accidental dislodgment of articles from the shelves of the supermarket or department store. The sidewalls of the basket are conventionally spaced apart such that they are spaced, at least adjacent the rearward ends thereof, slightly outwardly from the associated base structure. Because of this, the sidewalls of the basket thus project outwardly far enough to overhang the edges of the shelves and thereby dislodge articles from the shelves, often resulting in damage or breakage of such articles. This is obviously undesirable since not only does it result in financial loss to the merchant, but it also creates an embarrassment for the customer.

Conventional shopping carts also normally employ a wire tray mounted on the base of the cart. This tray generally extends between the side rails of the cart and is hinged adjacent its front end to facilitate upward swinging of the rear end of the tray when plural carts are nested together. The tray is conventionally mounted on the base by a pair of hog rings secured under the nuts of the front casters, which hog rings have loops which surround the front rod of the tray to secure the tray in position while functioning as hinges to facilitate pivoting of the tray during nesting. While this structure does operate in a satisfactory manner, nevertheless it greatly complicates the assembly of the base in that the tray and front casters must be substantially simultaneously assembled on the base. This makes the assembly of the base a complex and time-consuming operation.

Accordingly, it is an object of the present invention to provide an improved nestable shopping cart, and particularly a cart having an improved base structure, so that the resulting cart effectively overcomes the above-mentioned operational and structural shortcomings.

More specifically, it is an object of the present invention to provide an improved nestable shopping cart, as aforesaid, wherein the cart possesses an improved base structure which substantially improves both the nestability and stability of the cart. The improved base structure of the present invention possesses a widened inlet chute at the rearward end of the U-shaped base rail so that like carts can be easily and efficiently nested together even though substantial misalignment exists between the carts at the initiation of the nesting operation. The widened chute at the rearward end of the base rail is provided, in a preferred embodiment, by bending the rearward ends of the side rails angularly outwardly so as to increase the angle of divergence therebetween, which angle of divergence is preferably in the neighborhood of at least 30°, and may be as large as 45°. Since the rear wheel assemblies are mounted at the rearward free ends of the side rails, this results in the spacing between the rear wheel assemblies being substantially enlarged, whereupon the spacing between the front wheel assemblies can also be suitably enlarged, thereby providing increased stability against tipping of the cart.

Another object of this invention is to provide an improved nestable shopping cart, as aforesaid, wherein the base structure includes posts which extend upwardly from the rearward ends of the side rails and are joined to the basket structure, which posts are positioned outwardly a small distance from the sidewalls of the basket so that the posts function as bumpers which can rub along the free edge of the shelving to prevent the basket from striking and disloding articles from the shelves.

According to the present invention, the base rail is preferably formed from a single elongated tubular element, as by being bent into the desired U-shaped configuration, as is conventional in the known carts. However, a portion of each side rail adjacent the rear end thereof is provided with an additional outward bend so that each rail has a rearward portion which diverges outwardly at a larger angle, whereby these rearward portions form a flared chutelike opening at the rear end of the base rail. Two like carts can thus be substantially nested one within the other even though a substantially greater amount of angular misalignment exists between the two carts upon initiation of the nesting operation.

Another object of the present invention is to provide a nestable shopping cart, as aforesaid, wherein the bottom tray is mounted on the base in a manner so as to be free of rigid connection with the front casters, thereby simplifying not only the assembly of the base structure but also reducing the number of parts.

A further object of the present invention is to provide a nestable shopping cart, as aforesaid, which is compatible and nestable with similar known shopping carts which do not have a flared chutelike opening at the rearward end of the base.

Other objects and purposes of this invention will be apparent to persons familiar with structures of this type upon reading the following specification and inspecting the accompanying drawings.

BRIEF DESCRIPTION OF THE DRAWINGS

FIG. 6 is a perspective view of a different type of cart structure employing the improved base structure and also employing an improved bottom tray structure.

FIG. 7 is a fragmentary top view showing the forward end of the base structure and the mounting of the bottom tray thereon.

FIG. 8 is a fragmentary sectional view taken along line VIII—VIII in FIG. 7.

Figure 1:
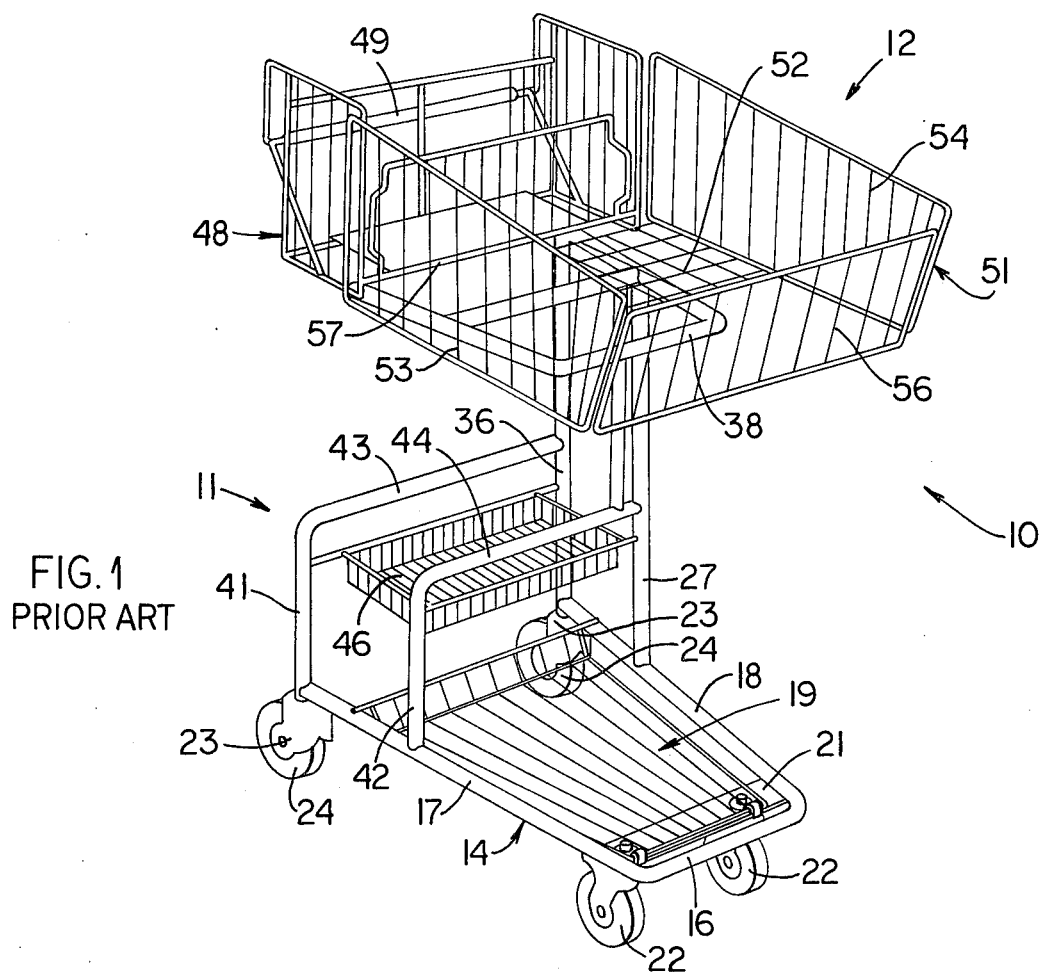
FIG. 1 is a perspective view of a conventional shopping cart, and particularly illustrating a conventional base structure.

Certain terminology will be used in the following description for convenience in reference only and will not be limiting. For example, the words "upwardly," "downwardly," "leftwardly" and "rightwardly" will refer to directions in the drawings to which reference is made. The terms "upper" and "lower" will also have reference to the shopping cart in its normal position of use, as appearing in FIG. 1. The terms "front" and "rear" will refer to the normal direction of movement of the shopping cart, the front end being the leftward end as appearing in FIG. 2. The words "inwardly" and "outwardly" will refer to directions toward and away from, respectively, the geometric center of the cart and designated parts thereof. Said terminology will include the words specifically mentioned, derivatives thereof and words of similar import.

SUMMARY OF THE INVENTION

In general, the objects and purposes of the present invention, including those specifically mentioned above, are embodied by a cart possessing a base structure having a base rail which utilizes a single elongated piece of tubing bent into a generally U-shaped structure opening rearwardly of the cart and having side rails which slightly diverge from the forward end of the cart toward the rearward end thereof. These side rails, as they project rearwardly from the front end of the cart, normally define an included angle therebetween of from about 10° to 16°, which angle is defined between elongated straight front rail portions. The front rail portions project rearwardly from the front end of the cart over a distance which is normally at least 70% of the overall length of the side rails. Each side rail terminates in a straight rear rail portion which projects rearwardly from the front rail portion and diverges outwardly relative thereto, whereby the rear rail portions define a rearwardly diverging angle therebetween which is in the order of approximately 30° to 45°. These rear rail portions have the rear wheel assembly mounted directly adjacent the rearward ends thereof. The base additionally includes upwardly projecting posts for supporting the basket, which posts are preferably spaced outwardly from the sides of the basket to thereby function as bumpers.

The objects and purposes of the present invention are also embodied by a base structure for a nestable cart having a wire tray mounted on and extending between the U-shaped base member, which member includes side rails projecting rearwardly of the cart. These side rails, adjacent the forward ends, are joined together by a support member which mounts the front casters. The bottom tray includes a front cross rod, the ends of which project into openings formed in the opposite side rails to hingedly mount the bottom tray for upward swinging movement during nesting. The ends of the front cross rod project into the side rails by a length substantially less than the diameter of the side rails so that the tray can be sequentially sidewardly displaced in opposite directions to permit the ends to be sequentially inserted into the openings in the opposed side rails. The tray includes rearwardly projecting support rods, which support rods pass over the caster support member. The casters are secured to the support member by suitable fastening devices, such as nuts, which project upwardly above the support member. The outermost pair of support rods on the bottom tray are disposed closely adjacent the outermost sides of the nuts to prevent sideward displacement of the tray, whereby the ends of the front cross rod are prevented from disengaging the side rails. The nuts permit limited upward swinging of the tray during nesting, while preventing any substantial sideward displacement of the tray.

DETAILED DESCRIPTION

FIG. 1 illustrates a conventional nestable shopping cart 10 employing a wheeled base assembly 11 supporting a basket assembly 12 thereon. The base assembly 11 includes a bottom tray 13 mounted on a rearwardly opening U-shaped base member or rail 14 which is formed integrally of one piece, as by being bent from an elongated tubular element. This base rail includes a front cross rail 16 joined to opposed side rails 17 and 18 which project rearwardly in diverging relationship with respect to one another and with respect to the longitudinal direction of the cart. Base rail 14 thus defines a space 19 in which is accommodated the base rail of a further cart to permit nesting between two such carts, which space 19 is also occupied by the tray 13.

The side rails 17 and 18, in this conventional cart, are straight throughout their complete length and normally diverge sidewardly at an angle of about 5° to 6° relative to the longitudinal direction of the cart. This thus results in the included angle between the diverging side rails being in the order of 10° to 12°, which included angle in some carts may be as large as approximately 16°.

A support plate 21 extends between and is fixed to the side rails adjacent the front end of the base, which plate 21 has front wheel assemblies 22 supported adjacent the opposite ends thereof. These front wheel assemblies comprise conventional swivel-type casters and have threaded stub shafts which project upwardly through the support plate 21, which stub shafts are suitably fixedly secured to the support plate by nuts 22A. The rearward ends of the side rails have downwardly opening cups or shrouds 23 fixed thereto, which shrouds in turn support the rear wheels 24.

The bottom tray 13 is formed from a plurality of wires or rods which are suitably bent and welded together, and for this purpose the bottom tray 13 includes an outer U-shaped wire which defines a front cross rod 26 integrally joined to side support rods 27 which extend rearwardly of the basket and are fixed to a rear cross rod 28. The rear cross rod has the free ends thereof projecting outwardly beyond the side support rods 27 so as to freely bear against the upper surfaces of the side rails 17 and 18 as shown in FIG. 1. The front end of the tray is secured by a pair of hog rings 29 which have loop portions extending around the front cross rod 26 for securing the tray in position while permitting it to swing upwardly during nesting. Each hog ring has a flange portion with an opening therethrough for permitting the hog ring to fit over the threaded shaft of a front caster, whereby the hog rings are suitably clamped between the support plate 21 and the nuts 22A. The tray also includes a plurality of intermediate support rods 31 which extend rearwardly of the cart and are fixedly connected between the front and rear cross rods 26 and 28, respectively. The tray 13 is substantially planar except for the rearward end thereof, which rearward end (as defined by the rear cross rod and the rearward ends of the support rods) is bent upwardly to facilitate the upward camming of the tray about the pivot axis defined by the front cross rod during nesting.

The base assembly 11 also includes a pair of upright support posts 36 and 37 fixed to the side rail 18 and projecting upwardly therefrom, which posts have their upper ends fixedly secured to a substantially U-shaped basket support member 38. A further pair of support posts 41 and 42 are fixed to and project upwardly from the other side rail 17, which posts are bent inwardly to form substantially horizontally extending crossover members 43 and 44. These members are respectively fixed to the support posts 36 and 37. The support posts 41 and 36, which are respectively fixedly connected to the rearward ends of the side rails 17 and 18, are normally spaced apart by a distance slightly less than the maximum width of the basket assembly, whereby these support posts are thus spaced inwardly a small amount with respect to the planes defined by the adjacent exterior sidewalls of the basket.

A small intermediate basket 46 is disposed below the main basket assembly 12 and is positioned to extend across the region defined between the crossover rails 43 and 44, substantially as shown in FIG. 1.

With respect to the basket assembly 12, same includes a rear section 48 which is conventionally referred to as the baby seat section in that it is designed to accommodate an infant or small child. A handle 49 is fixed to and extends transversely across this rear section 48. A front basket section 51 joins with the rear basket section 48 and projects forwardly therefrom. This front section 51 includes a bottom wall 52 which overlies the basket support member 38 for supporting the front basket section thereon. The front basket section also includes opposed sidewalls 53 and 54 joined together by a front wall 56. The lower rearward edge of the front basket section is joined to the rear basket section by an elongated transversely extending rod 57, which rod hingedly connects the front basket section to the rear section so that the front basket section can thus be swung upwardly through an angle of about 90°, whereupon the front basket section thus assumes a substantially vertical position to facilitate the nesting of similar such baskets. To permit this upward swinging of the front basket section, the sidewalls 53 and 54 are spaced apart by a distance slightly greater than the sidewalls of the rear basket section, whereby the sidewalls of the front section thus overlap the sidewalls of the rear section when the basket section is in its vertical nesting position.

The overall structure and operation of the cart 10, as shown in FIG. 1, is well known so that further description thereof is not believed necessary.

Figure 2:
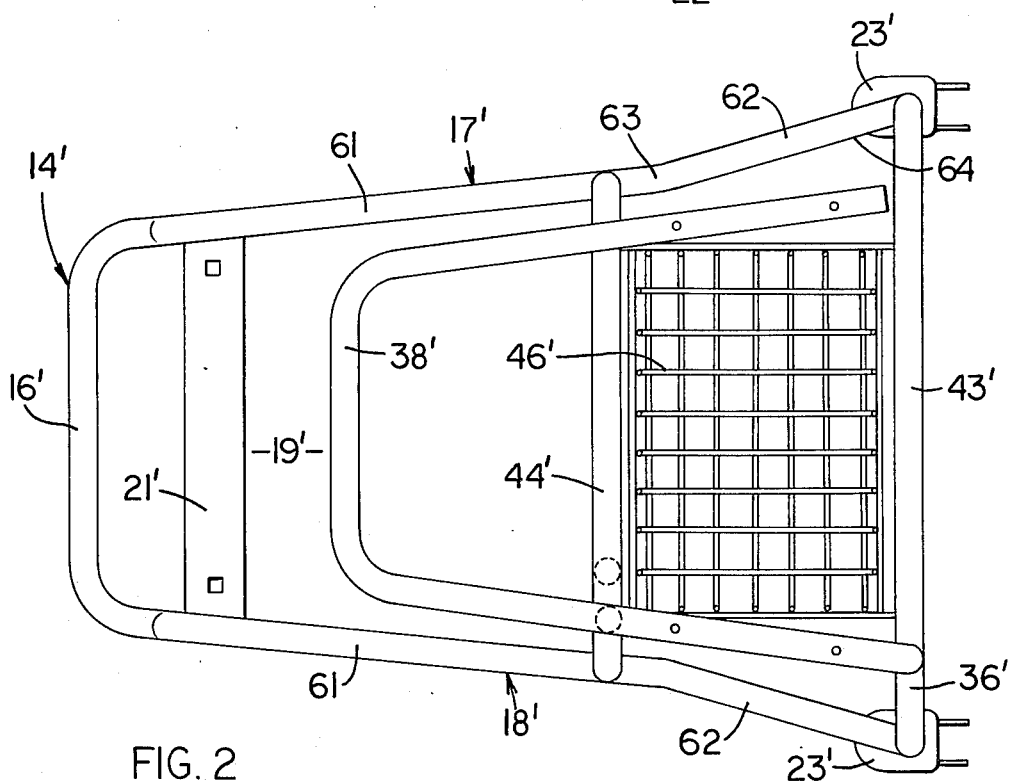
FIG. 2 is a top view showing the improved base structure of the present invention, the bottom tray having been removed for clarity of illustration.
Figure 3:
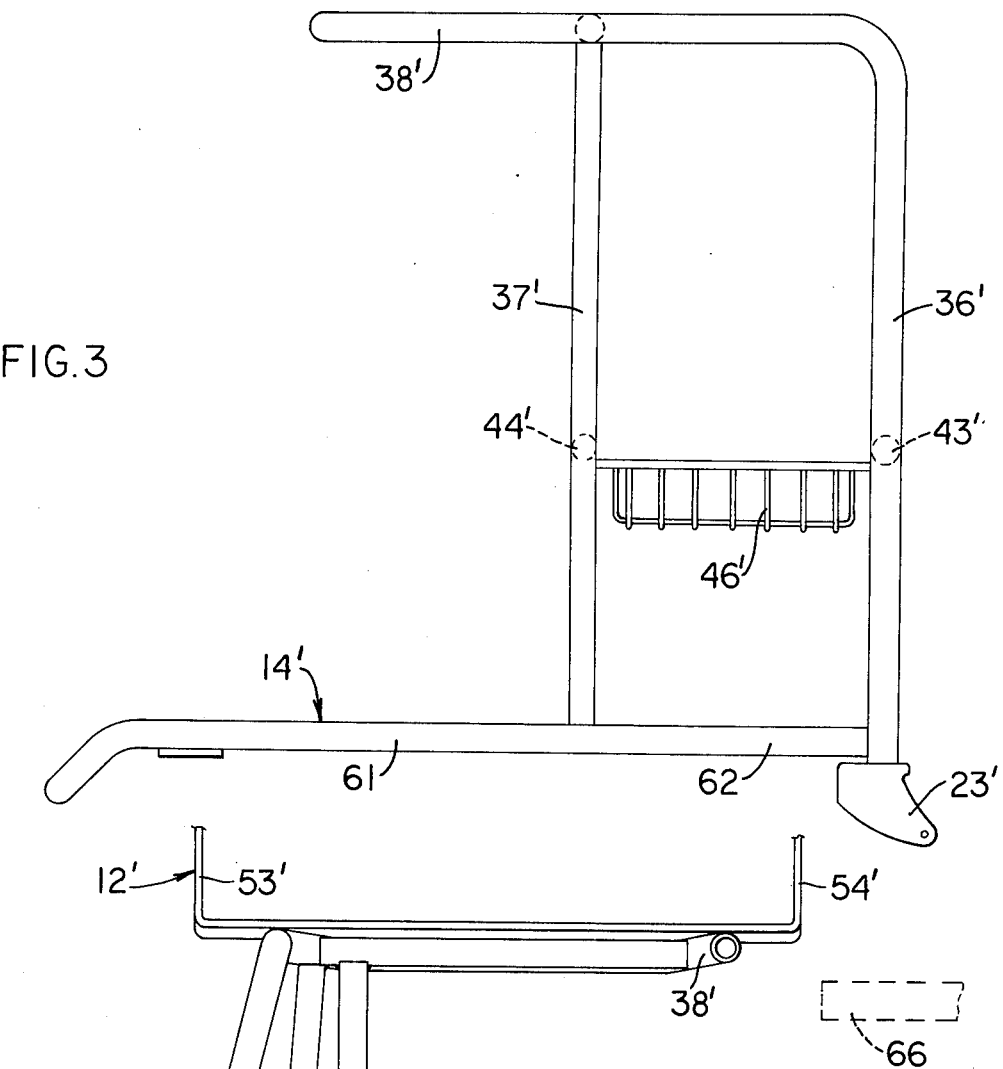
FIG. 3 is a side elevational view of the base structure shown in FIG. 2.
Figure 4:
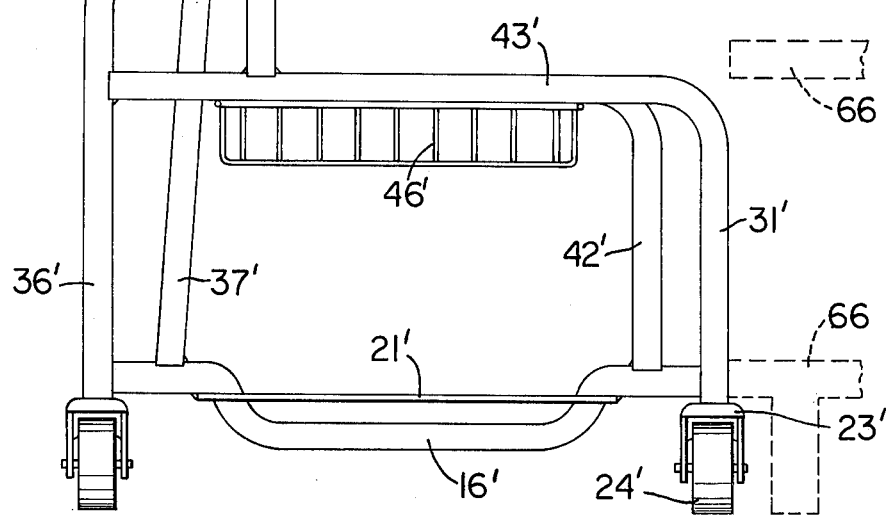
FIG. 4 is a rear elevational view of the base structure shown in FIG. 2, and showing a fragment of the basket assembly.

Referring now to FIGS. 2–4, there is illustrated the improved base assembly according to the present invention, which base assembly cooperates with the basket assembly in the same manner illustrated in FIG. 1. Accordingly, the components of the base assembly shown in FIGS. 2–4 have been designated by the same reference numerals utilized in FIG. 1 but with the addition of a prime (') thereto.

The side rails 17' and 18' each includes a straight front rail section 61 which projects rearwardly from the front cross rail 16'. The front rail section 61 diverges outwardly relative to the rearward longitudinal direction of the cart, whereby the rail sections 61 thus diverge outwardly in a manner identical to the side rails 17 and 18 of FIG. 1. That is, the front rail portions 61 diverge at an angle of approximately 5° to 6° relative to the longitudinal direction of the cart, so that the included angle between the front rail portions 61 is thus in the order of 10° to 12°. However, the front rail portions 61 do not extend the complete length of the cart, but rather extend rearwardly through a distance which is normally between about 70% and 85% of the overall length of the side rails 17' and 18'.

The remaining length of the side rails 17' and 18' is occupied by the rear rail portions 62, which portions are joined to the rearward ends of the front rail portion 61 by means of intermediate bends 63. The rear rail portions 62 thus project rearwardly to the rearward edge of the cart, whereby they terminate at the rearward uprights 36' and 41'.

The rear rail portion 62 also diverges outwardly relative to the rearwardly extending longitudinal direction of the cart, and in addition also diverges outwardly with respect to the rearward longitudinal direction of the front rail section 61. These rear rail portions 62, which are of increased divergence when compared to the front rail portions 61, thus result in the base rail 14' having a flared chutelike opening 64 formed at the rearward end thereof.

The rear rail portions 62, in the illustrated embodiment, diverge outwardly at an angle of approximately 10° relative to the longitudinal direction of the respective front rail portion 61, whereby the opposed rear rail portions 62 thus define an angle therebetween which is in the neighborhood of approximately 30°.

The rear rail portion 62 thus diverges outwardly relative to the front rail portion 61 at an angle which is approximately twice as great as the angle of divergence between the front rail portion 61 and the longitudinally extending direction of the cart. This thus results in the angle of divergence between the rear rail portions 62 being approximately three times as great as the angle of divergence between the front rail portions 61.

Because of the additional divergence provided by the rear rail portions 62, the rear wheel assemblies 24' are thus axially spaced apart by a substantially increased distance, thereby increasing the stability of the rearward end of the cart against tipping. The increased spacing between the rear wheels 24' also permits the front wheel assemblies 22' to be moved further apart so that they are positioned substantially directly under the side rails, thereby increasing the stability of the cart against tipping at the forward end thereof.

This increased spacing between the rearward ends of the base rail 14' also results in the rear support posts 36' and 41' being spaced further apart so that these posts, as they project vertically upwardly, are positioned outwardly from the planes defined by the exterior sidewalls of the basket assembly, substantially as illustrated in FIG. 4. These posts 36' and 41' thus function as bumpers and hence are positioned to enable them to rub along the lowermost shelf 66 as associated with a merchandising rack, thereby preventing the sidewalls of the basket from projecting over the shelves and dislodging the articles therefrom. The remaining support posts 37' and 42' are fixed to the rearward ends of the front rail portions 61 closely adjacent the intermediate bends 63, whereby they project vertically upwardly for support of the basket assembly.

Figure 5:
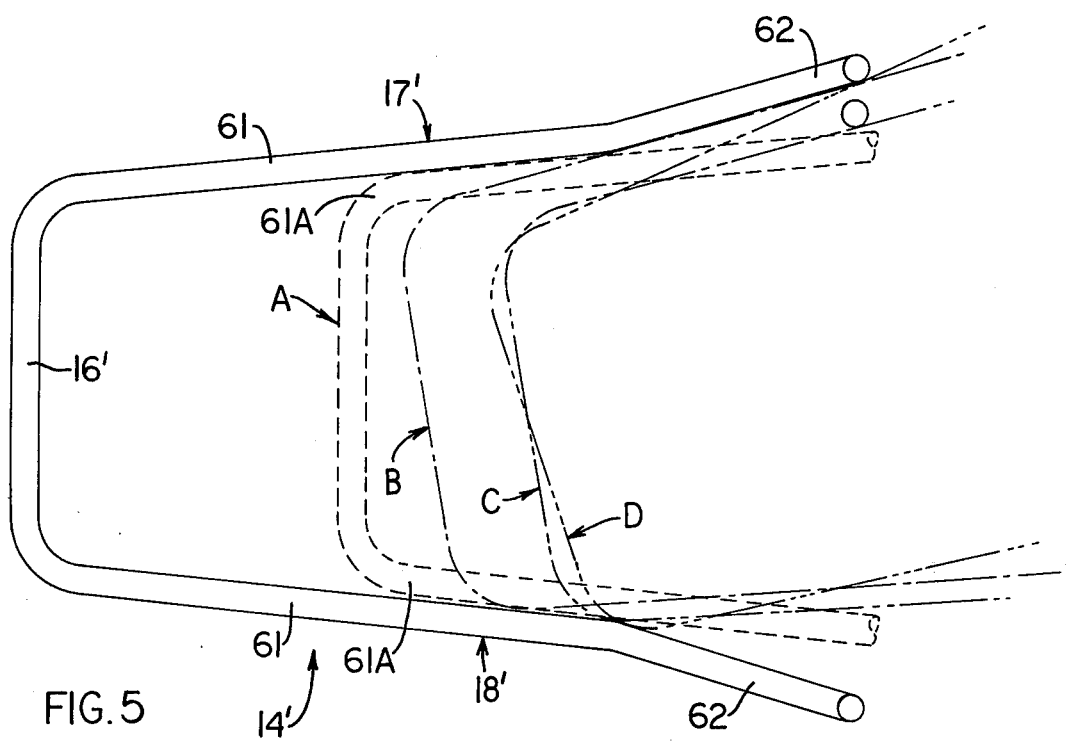
FIG. 5 illustrates the improved base rail member of the present invention, and also diagrammatically illustrates the nesting capability of this improved base structure.

Because of the flared inlet opening 64, defined between the rear rail portions 62, the nesting of two or more like carts is greatly simplified, as evidenced by the diagrammatic representations of FIG. 5.

When two carts are fully nested, then the base rail 14' of one cart is positioned as shown by solid lines in FIG. 5, whereas the front end of the other cart is inserted into the base rail 14' so that the forward end thereof is positioned substantially as illustrated by the dotted line A. In this fully nested condition, the front rail portions 61 of the frontmost cart overlap and are positioned directly adjacent the corresponding front rail portions 61A of the other cart.

On the other hand, when two carts are being nested together, and assuming that the cart B illustrated by the dot-dash line is misaligned with respect to the base member 14', then cart B can be misaligned to the extent that the front rail portions 61B thereof are adjacent and substantially parallel to the rear rail portions 62. This misalignment of cart B thus amounts to an angle of approximately 10° relative to the longitudinal direction of the base member 14', even though the cart B can still be moved into the base member 14' over a major portion of the fully nested length. For example, as illustrated in FIG. 5, even with this degree of misalignment, the cart B can still be inserted into the base member 14' over approximately three-fourths of the overall nesting distance, after which further movement of the cart B into the base member 14' requires that the cart B be more closely aligned with the base member 14'so as to permit complete nesting therebetween. However, after the cart B has been inserted to the position illustrated by the dot-dash line, then proper alignment of cart B can be easily manually accomplished, which alignment is assisted by the camming action which takes place between the base rails of the two carts. Thus, even with this substantial amount of misalignment, a substantial magnitude of nesting between the two carts can be readily achieved prior to requiring any precise alignment between the two carts.

In contrast, attention is directed to the cart C as designated by the double dot-dash line. This illustrates the relationship of the base member when nesting is being accomplished utilizing two conventional base members, such as the base member 14 shown in FIG. 1. In this case, the base member does not have a flared chutelike opening at the rearward end thereof, so that when cart C is inserted into the rearward open end of the base member and is misaligned at the same angle noted above with respect to cart B, namely a misalignment angle of 10°, the front end of cart C can be inserted into the base member 14 through a much smaller distance in contrast to the degree of nesting which is possible with the cart of the present invention, Thus, even though the carts B and C are initially nested with the same degree of misalignment, nevertheless the base 14' of the present invention permits the cart B to be nested through a substantially greater distance than is possible when the cart is provided with a conventional base 14.

FIG. 5 also illustrates that the base member 14' of the present invention greatly simplifies the overall nesting of the carts, particularly with respect to the necessary alignment thereof during the nesting manipulations. For example, the cart D, as illustrated by the triple dot-dash line, has been inserted into the base 14' by a distance which is roughly equivalent to the amount of insertion achieved by the cart C. However, due to the flared opening 64 provided by the rear rail sections 62, the cart D can be inserted through this distance while having a large degree of misalignment with respect to the base member 17'. In the illustrated embodiment, this degree of misalignment of cart D relative to the longitudinal direction of the base 14 is approximately 20°, which degree of misalignment is thus approximately double the misalignment possible when utilizing a conventional base, as illustrated by the cart C, while at the same time permitting the two bases to be partially nested together (that is overlapped) over substantially the same distance. Thus, the cart D, after being inserted into the illustrated position while possessing this large degree of misalignment, can thus be partially aligned to substantially a 10° position so that the cart can then be pushed inwardly into the position B, following which further alignment is necessary to permit full insertion of the cart into the position A. Thus, nesting of the carts is possible even though very litle alignment between the carts is necessary prior to the initiation of the nesting manipulations.

While the base structure illustrated and described above employs an angle of between 10° and 12° between the opposed front rail portions 61 and an included angle of approximately 30° between the diverging rear rail portions 62, substantially similar relationships are preferably maintained when the base structure employs a larger included angle between the front rail portions. For example, if the included angle between the front rail portions 61 is increased so as to be in the range of 15° to 16°, then the angle of divergence of the individual rear rail portions relative to the respective front rail portions is preferably approximately double the divergence of the front rail portions, so that the included angle of divergence between the rear rail portions 62 for this base structure would normally be approximately 45°. With a base structure of this type, however, the length of the rear rail portions relative to the overall length of the side rails can normally be maintained at a minimum, such as in the order of approximately 15 to 20% of the overall length of the side rails.

While the structural and operational descriptions set forth above have related to a cart of the type wherein the basket assembly is coordinated with the counter so that the basket bottom is thus at an elevation closely adjacent the top surface of the counter, it will be recognized that the base structure of the present invention is also applicable to a conventional shopping cart of the type disclosed in U.S. Pat. No. 2 898 123. A shopping cart of this latter-mentioned type is illustrated in FIG. 6, except that the base structure has been modified so as to have side rails provided with front portions which diverge rearwardly at a first angle, which side rails also have rear portions which diverge rearwardly at an increasing angle so as to define a flared rearwardly opening chute to facilitate nesting. The base structure shown in FIG. 6 thus incorporates the same advantageous structural and operational features possessed by the base shown in FIGS. 2–5. Thus, corresponding parts of the cart and base structure shown in FIG. 6 have been identified by the same reference numerals utilized in FIGS. 1–5 but with the addition of a double prime (") thereto.

The cart 12" illustrated in FIG. 6 also has an improved bottom tray 13" associated with the base structure. This tray 13" again includes front and rear cross rods 26" and 28", respectively, which rods are rigidly joined together by side support rods 27" and intermediate support rods 31'. The tray thus substantially occupies the space defined between the side rails 17" and 18", with the tray being substantially flat except for the rear portion which is bent upwardly.

According to the present invention, the front cross rod 26" and side supporting rods 27" are not formed integrally as by being bent from a single elongated rod. Rather, the front cross rod 26" is formed as a single straight element and is provided with projecting end portions 72 which extends outwardly beyond the side support rods 27" substantially as illustrated in FIG. 7. These end portions 72 extend into suitable openings 71 formed in the adjacent walls of the hollow rail portions 61", whereby the front cross rod 26" is mounted on and hingedly connected to the opposed side rails of the base. These end portions 72 project only part way into the respective side rails 61 so that the tray 13" can be mounted on the base 11" by slightly tilting the cross rod 26" so that one of the end portions 72 is aligned with one of the openings 71, whereupon the tray is displaced sidewardly to insert the one end portion 72 into the respective opening, which insertion continues until the end portion 72 substantially abuts the outer wall of the respective side rail. When in this position, the cross rod 26" can be tilted downwardly between the opposed rail portions 61" so that the other end portion 72 is respectively aligned with the opening 71 in the other rail portion, whereupon the tray is then sidewardly displaced in the opposite direction to insert the other end portion 72 into the opposite side rail. In this manner, the bottom tray can be hingedly mounted on the side rails without requiring clamps or other rigid connecting devices.

To prevent the tray from being displaced sidewardly a sufficient extent to permit one of the end portions 72 from disengaging its respective side rail, the tray 13" is designed to coact with the nuts 22A" in the manner illustrated in FIGS. 7 and 8. That is, the cross rod 26" is positioned directly forwardly of the support plate 21"', whereby the side rods 27" and intermediate rods 31" pass over the support plate 21" as they project toward the rear of the cart. The nuts 22A" which secure the front caster assemblies to the support plate 21" thus project upwardly adjacent the side rods 27". In the illustrated embodiment, the pair of nuts 22A" are positioned so that they are straddled by the side rods 27", which side rods are disposed closely adjacent the respective nuts and positioned at an elevation below the upper edges of the nuts as shown in FIGS. 7 and 8. The side rods 27"', and their opposed straddling relationship with the nuts 22A", thus prevent any substantial sideward displacement of the tray 13", and thus effectively prevent the end portions 72 from being withdrawn from the side rails. At the same time, the nuts 22A" are of sufficient height to permit the rearward end of the tray 13" to swing upwardly through the extent necessary to facilitate nesting without the side rods 27" moving upwardly beyond the nuts. This latter-mentioned relationship is illustrated by the dotted line showing of the rod 27" in FIG. 8.

This mounting of the bottom tray on the base thus totally eliminates the need for hog rings 29 as shown in FIG. 1, whereby the front casters and the bottom tray can be individually and sequentially mounted on the base, rather than being simultaneously assembled as with the prior structures. The present invention thus greatly facilitates the assembly of the base, and also minimizes the number of parts. Also, the front cross rod and side rods are no longer bent from a single piece, whereby an additional bending operation is thus eliminated.

The bottom tray 13' shown in FIG. 6 includes a further feature to assist in elevating the rearward end of the tray. This feature involves the use of U-shaped end portions 73 provided on the opposite ends of the rear cross rod 28". These end portions 73 are integral with the rear cross rod, as by being bent from the rod, and are positioned so that they project downwardly below the cross rod and open inwardly so that the lower free leg of the portion 73 bears against the side rail. These downwardly directed U-shaped end portions 73 thus permit the rearward end of the tray to be maintained at a higher elevation relative to the base rail without substantially increasing the structural or manufacturing complexity of the bottom tray.

It will be appreciated that the improved bottom tray 13″, and the manner in which it mounts on the base, is equally applicable to not only the base structure illustrated in FIGS. 2-5, but also conventional shopping cart base structures which do not employ a flared chute at the rearward end thereof. For example, this tray structure could be provided on a conventional base structure as illustrated in FIG. 1.

Although a particular preferred embodiment of the invention has been disclosed above for illustrative purposes, it will be understood that variations or modifications thereof which lie within the scope of the appended claims are fully contemplated.

The embodiment of the invention in which an exclusive property or privilege is claimed are defined as follows:

1. In a nesting-type shopping cart having a wheel-supported base structure and a basket assembly mounted on said base structure, said base structure including a substantially horizontally extending U-shaped base member and upright means fixedly interconnected to said base member and projecting upwardly therefrom for supporting said basket assembly, said upright means maintaining the bottom wall of said basket assembly spaced upwardly a substantial distance above said base member, said U-shaped base member opening rearwardly of said cart and including a pair of opposed side rails which extend longitudinally of said cart throughout the length thereof, said side rails diverging outwardly relative to the rearward longitudinal direction of said cart, comprising the improvement wherein each side rail includes a first elongated rail portion which is straight and extends rearwardly of said cart from the forward end thereof over a major portion of the length of the cart, said first rail portion diverging outwardly at a small angle relative to the rearward longitudinal direction of said cart, each side rail including a second elongated rail portion which is straight and extends rearwardly from the rearward end of said first rail portion, said second rail portion terminating at the rearward end of said cart, said second rail portion diverging outwardly relative to the longitudinal direction of said first rail portion as said second rail portion projects toward the rearward end of said cart, whereby the second rail portions define a flared chutelike opening at the rearward end of said base member.

2. A shopping cart according to claim 1, wherein the angle defined between said first rail portions is in the approximate range of 10° to 16°, and wherein the angle defined between said second rail portions is at least approximately 30°.

3. A shopping cart according to claim 1, wherein said first rail portions extend over at least approximately 70% of the overall length of the cart, and wherein the second rail portions extend over the remaining length of the cart.

4. A shopping cart according to claim 3, wherein the angle defined between said second rail portions is at least twice as large as the angled defined between said first rail portions.

5. A shopping cart according to claim 4, wherein said second rail portions extend through at least 15% of the overall length of said side rails.

6. A shopping cart according to claim 1, including a pair of rear wheel assemblies connected to and positioned directly under said second rail portions adjacent the rearward ends thereof, and a pair of front wheel assemblies connected to said U-shaped base member adjacent the front end thereof, said front wheel assemblies being disposed adjacent and positioned substantially directly under said first rail portions adjacent the forward ends thereof.

7. A shopping cart according to claim 6, wherein said basket assembly includes an upwardly opening basket having a pair of opposed sidewalls, said upright means including a pair of upright members fixed to the rearward ends of said second rail portions and projecting vertically upwardly therefrom, said upright members being spaced slightly outwardly from the adjacent sidewalls of the basket so that said upright members function as side bumpers for the cart.

8. A shopping cart according to claim 7, wherein at least one of said upright members includes a vertical portion which projects upwardly from the base member, said vertical portion being integrally connected to an inclined portion which projects upwardly and inwardly and is connected to the basket.

9. A shopping cart according to claim 7, wherein the first rail portions define an angle therebetween which is approximately in the range of 10° to 16°, and wherein said second rail portions define an angle therebetween which is approximately in the range of 30° to 45°.

10. A shopping cart according to claim 9, wherein said U-shaped base member is bent from a single elongated tubular element.

11. A shopping cart according to claim 9, wherein said upright means includes means associated therewith and positioned directly under the bottom wall of said basket for supporting same, said basket assembly being supported solely by said last-mentioned means, and said basket assembly including (1) a rear basket portion which is fixedly related to said upright means and (2) an enlarged upwardly opening front basket portion which is hingedly movable relative to said rear basket portion between a substantially horizontal position wherein it is supported on said upright means and a vertical position wherein it is stored to permit nesting of the cart with a further cart.

12. A shopping cart according to claim 1, wherein said second rail portion diverges outwardly relative to said first rail portion at an angle which is approximately twice as large as said small angle which defines the divergence of the first rail portion relative to the rearward longitudinal direction of the cart.

13. A shopping cart according to claim 1, wherein the angle defined between the second rail portions is approximately three times larger than the angle defined between said first rail portions.

14. A shopping cart according to claim 1, wherein the angle defined between the second rail portions, which angle defines the flared chutelike opening, is approximately in the range of 30° to 45°.

15. In a nesting-type shopping cart having a wheel-supported base structure and a basket assembly mounted on said base structure, said base structure including a pair of elongated side rails which are disposed substantially horizontally and extend from the front end of the base structure in a diverging relationship toward the rear end of the base structure, a support member fixed to and extending transversely between said side rails adjacent the front ends thereof, a pair of wheel assemblies mounted on said support member adjacent the opposite ends thereof so that said wheel assemblies are disposed adjacent and below the side rails for rolling engagement with a support surface, each said wheel assembly having a removable fastener member disposed above said support member for fixedly mounting said wheel assembly thereon, and a wire tray mounted on said base structure and extending rearwardly thereof in the region between said side rails, comprising the improvement wherein said tray includes a cross rod disposed adjacent the forward end thereof and extending transversely between said side rails, said cross rod having rod portions projecting outwardly from opposite ends thereof and disposed within openings formed in the opposed side rails for hingedly supporting said tray on said side rails, said tray including a plurality of supporting rods fixed up to said front cross rod and projecting rearwardly of said base structure and being attached to a rear cross rod which extends transversely between and bears on the side rails adjacent the rearward ends thereof, one of said supporting rods being disposed closely adjacent one of said removable fastening members, and another of said supporting rods being disposed closely adjacent the other removable fastening member, whereby said removable fastening members and said two mentioned supporting rods are disposed in straddling relationship to one another, said removable fastening members projecting upwardly above said supporting rods whereby said fastening members prevent any substantial sideward displacement of said tray yet permit limited upward swinging movement of said tray about said front cross rod during nesting.

16. A shopping cart according to claim 15, wherein the projecting rod portions at the free ends of the front cross rod project into said side rails by a distance which is no more than about one-half the width of the respective side rails so that the opposite ends of the front cross rod can be alternately and sequentially inserted into the respective side rails by appropriate sideward shifting of the tray.

17. A shopping cart according to claim 16, wherein said tray is supported on said base structure solely by the engagement which exists between said side rails and the opposite ends of said front and rear cross rods.

18. In a nesting-type shopping cart having a wheel-support base structure and a basket assembly mounted on said base structure, said base structure including a pair of elongated side rails which extend longitudinally of the base structure along the opposite sides thereof, said rails diverging with respect to one another as they extend from the front to the rear end of the base structure, said base structure also including a first pair of support roller assemblies mounted adjacent the front ends of the side rails and a second pair of support roller assemblies mounted adjacent the rear ends of said side rails, said base structure further including a wire tray mounted thereon in the region between said side rails and extending longitudinally of said base structure over a substantial portion of the length thereof, said tray being supported for swinging movement with respect to said side rails about a horizontal axis to permit said base structure to nest with a further base structure, comprising the improvement wherein said tray includes first and second elongated cross rods respectively disposed adjacent the front and rear ends of the tray and extending transversely between the opposed side rails, said first and second cross rods being rigidly joined together by a plurality of elongated supporting rods which extend approximately in the longitudinal direction of the cart and define a supporting surface, said supporting rods being transversely spaced apart from one another, said first cross rod having rod portions projecting axially outwardly from opposite ends thereof and hingedly supported on the opposed side rails, said rod portions projecting outwardly beyond the outermost longitudinal supporting rods, said side rails having socket means associated therewith adjacent the front ends thereof for receiving therein said rod portions whereby said first cross rod is constrained from displacement in a direction transverse to its longitudinally extending axis, the second cross rod having outwardly projecting portions on the ends thereof which are disposed in bearing engagement with the side rails adjacent the rear ends thereof, whereby said tray can hingedly swing relative to said side rails about the longitudinal axis of said first cross rod, and projection means fixedly associated with said base member and projecting upwardly for embracing relationship with at least one of said longitudinal supporting rods preventing sideward displacement of said tray relative to said side rails, said projection means functioning solely as an abutment for preventing said sideward displacement of the tray.

* * * * *

UNITED STATES PATENT AND TRADEMARK OFFICE
CERTIFICATE OF CORRECTION

PATENT NO. : 4 067 591
DATED : January 10, 1978
INVENTOR(S) : Harry Celms

It is certified that error appears in the above-identified patent and that said Letters Patent are hereby corrected as shown below:

Column 13, Line 17; delete the word "up".

Column 14, Line 43; after the word "rods" insert ---for---.

Signed and Sealed this

Eleventh Day of July 1978

[SEAL]

Attest:

RUTH C. MASON
Attesting Officer

DONALD W. BANNER
Commissioner of Patents and Trademarks

Disclaimer 4,067,591.—*Harry Celms*, Battle Creek, Mich. BASE FOR NESTABLE SHOPPING CART. Patent dated Jan. 10, 1978. Disclaimer filed July 14, 1981, by the assignee, *Roblin Industries, Inc.*

Hereby enters this disclaimer to claims 1, 2, 3, 4, 5, 6 and 14 of said patent.

[*Official Gazette Sept. 15, 1981.*]